Oct. 1, 1963  E. ASHFORD  3,105,753
FIXTURE FOR STRETCH SEVERING OF GLASS TUBES
Filed May 14, 1958  6 Sheets-Sheet 1

INVENTOR
Ernest Ashford
BY Robertson and Youtie
ATTORNEYS

Oct. 1, 1963     E. ASHFORD     3,105,753
FIXTURE FOR STRETCH SEVERING OF GLASS TUBES
Filed May 14, 1958     6 Sheets-Sheet 2

INVENTOR
Ernest Ashford
BY Robertson and Youtie
ATTORNEYS

Oct. 1, 1963  E. ASHFORD  3,105,753
FIXTURE FOR STRETCH SEVERING OF GLASS TUBES
Filed May 14, 1958  6 Sheets-Sheet 3
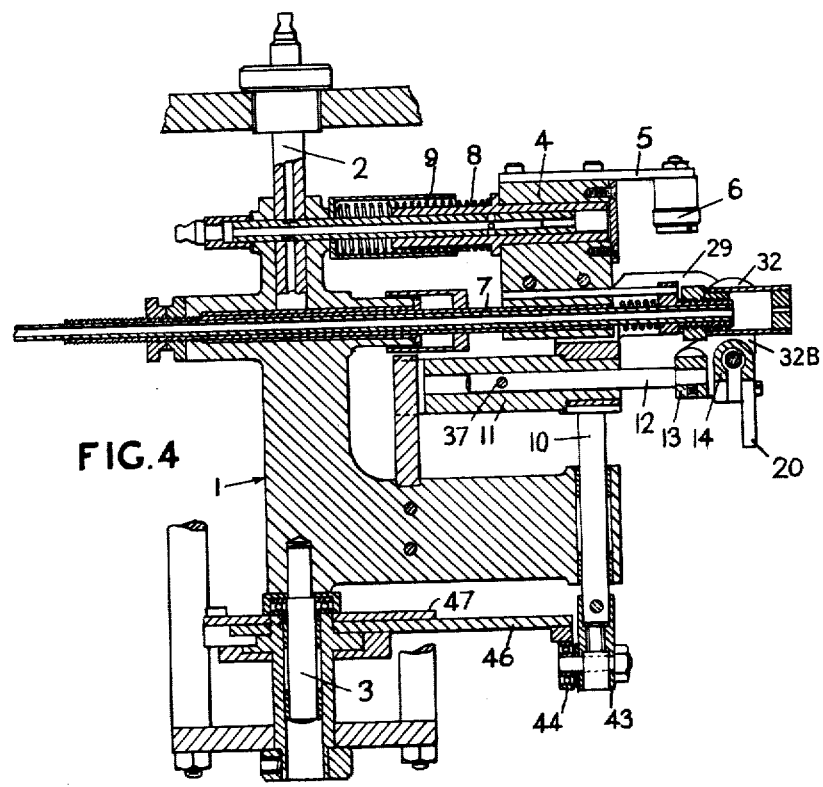
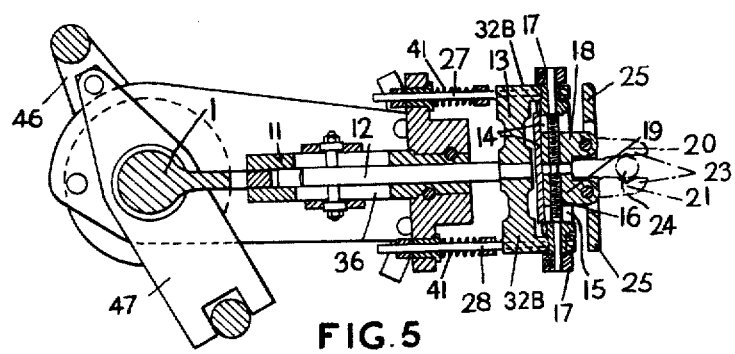
INVENTOR
Ernest Ashford
BY Robertson and Youthe
ATTORNEYS

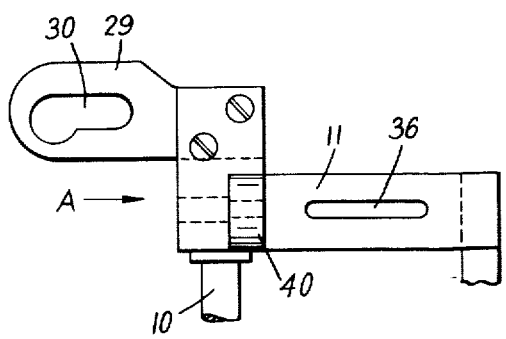
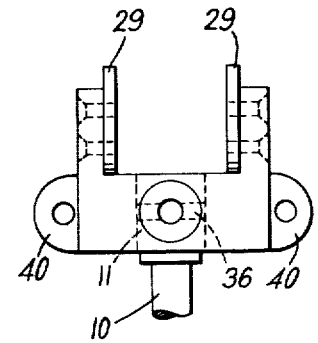
FIG.7.  FIG.8.
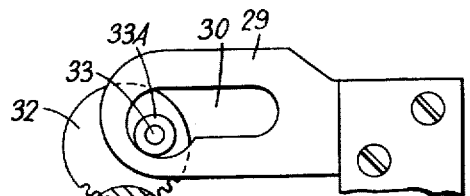
FIG.9.
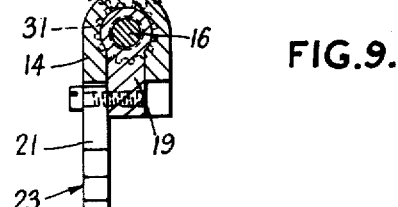
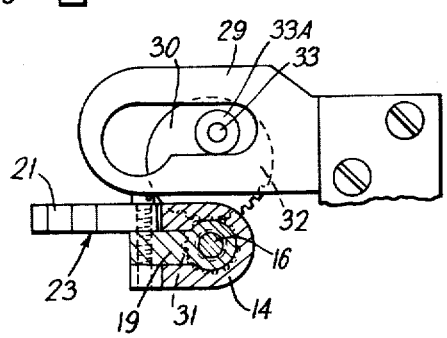
FIG.10.
INVENTOR
ERNEST ASHFORD
BY Robertson and Voutie
ATTORNEYS

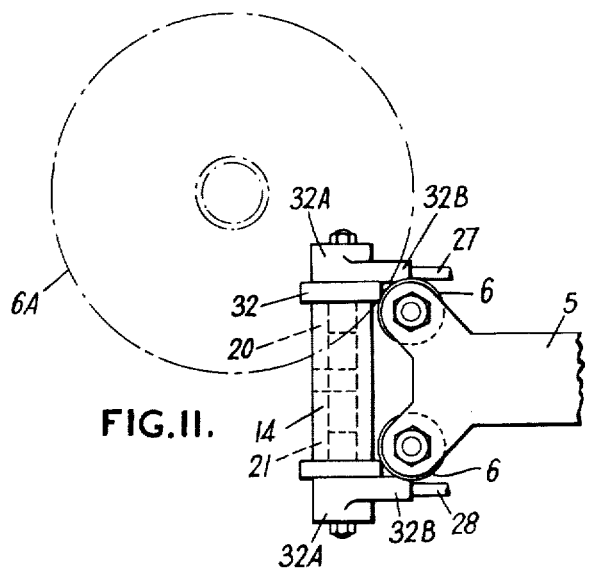
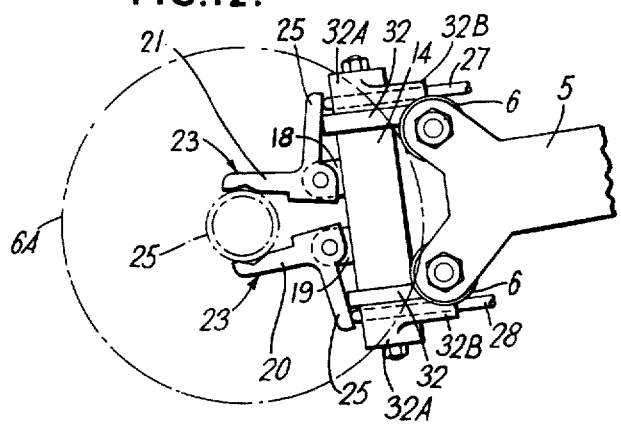

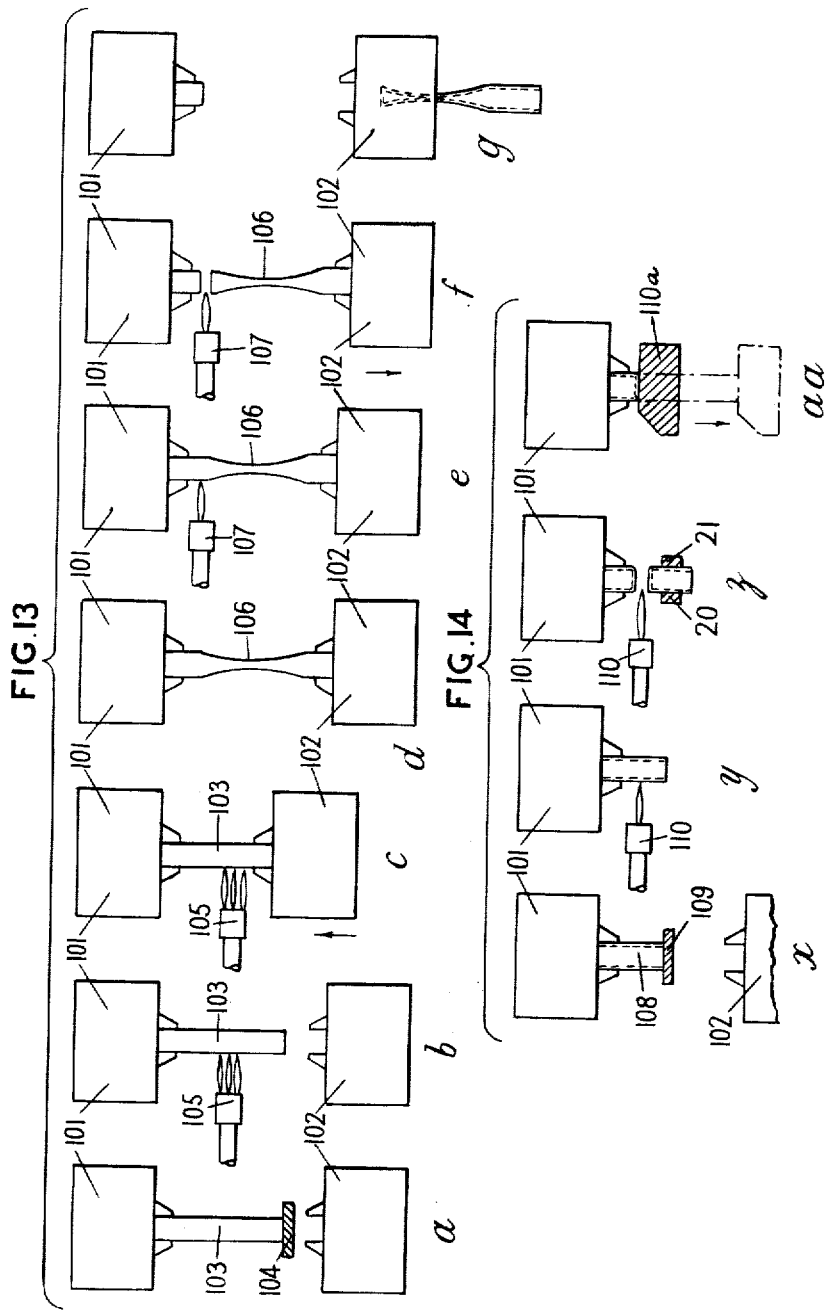

United States Patent Office 3,105,753
Patented Oct. 1, 1963

3,105,753
FIXTURE FOR STRETCH SEVERING OF
GLASS TUBES
Ernest Ashford, London, England, assignor to Johnsen &
Jorgensen Limited, a British company
Filed May 14, 1958, Ser. No. 735,330
3 Claims. (Cl. 65—283)

The present invention is concerned with the manufacture of ampoules and other like glass containers of the kind having a tubular body terminating at one end in a flat round or pointed bottom and at the other end in a substantially tubular stem of reduced diameter. More particularly the invention relates to the manufacture of drawn stem containers from glass tubing which is normally carried out in machines constructed for the purpose and incorporating a series of rotating chucks revolving continuously about a central vertical axis.

Glass containers of the kind referred to are usually made in a container making machine of the type which comprises a rotatable head carrying a plurality of rotatable chucks, the containers being formed in a series of successive operations from glass tubes (canes) held vertically in the chucks, various forming, shaping and drawing operations being effected under the action of heat applied by flames directed upon the tubes. In other words in a machine of this type a number of chucks are disposed around the head and as the head rotates, the chucks (each carrying a tube of glass), are moved steadily around and through a series of operating positions. At each position a certain operation is carried out in such a way that a length of glass at the bottom of each tube is shaped into a container and is finally detached from the rest of the tube. In this specification such machines are referred to as "conventional machines for making glass containers."

In these conventional machines it has been the practice hitherto to tolerate the manufacture of a defective container every time a new length of glass tubing was introduced into the machine and to reject this defective container when it issued from the machine. The reason for the appearance of a defective container every time a new length of tubing is introduced arises from the fact that under normal methods of operation there is no provision for sealing the open end of the tube. Therefore the first container has to be made with no bottom but in the process of parting this first container from the parent tube a bottom is formed at the lower end of the remaining length of tube and this forms the bottom of the second container and so on.

This mode of operation is effective but it is wasteful of glass and for this reason experiments have been made with a view to overcoming this drawback of existing practice. It would not be acceptable to use tubing which was supplied with one or both ends previously sealed as we consider it desirable to wash through the tubing immediately prior to fabrication into containers.

One object of the present invention is to provide means for making containers of the kind referred to above with less waste of glass than heretofore.

According to a feature of the present invention we provide a method of making glass containers of the kind referred to from glass tubing comprising the steps of feeding lengths of glass tubing successively into a machine and forming a bottom in each length of glass tubing before any containers are made therefrom.

The invention also includes a machine or a fitment to a machine for carrying out the above method. Conveniently each tube has a small portion removed from the lower end in such a way that a bottom is formed in the tube as the small portion is drawn away. It will be understood that the portion removed is considerably smaller than a complete container and therefore less glass is wasted. A machine according to the invention may have means arranged to engage wtih the chucks carrying the glass tubes and adapted to seize the end of any glass tube which has just been fed into the machine and to draw off the end in conjunction with suitable burners for heating and softening the tube. The drawing off mechanism therefore operates selectively in the sense that the mechanism seizes the end of a newly inserted tube which has just been inserted and from which no containers have yet been made but the mechanism does not seize any tubes with containers in the process of being made. In other words the mechanism seizes tubes with open lower ends but allows tubes with bottoms to pass the station freely.

According to this feature of the invention I provide a conventional machine for making glass containers with means operable to form a bottom at the lower end of a tube before any containers are made from that tube. To this end I may provide mechanism in a conventional machine for making glass containers, comprising an arm pivotally mounted on a main pivot at a position outside the pitch circle upon which the chucks of the machine revolve, a slidable member carried by the arm and having means e.g. rollers at its inner end to engage the chucks successively as the head rotates to effect angular displacement of the arm relatively to its pivot and a linear displacement of the member relatively to the arm, means to heat a part of a newly inserted tube near to the bottom thereof, and a pair of jaws adapted to seize the tube below the heated section and to pull downwardly on the seized part of the tube to remove the seized part and at the same time to form a bottom in the remaining length of tube.

It will be understood that in a conventional machine for making glass containers the chucks are concentrically arranged around the head and that they are of uniform diameter so that as the head rotates the arm comprising a part of the mechanism for forming a bottom in a newly inserted tube is successively picked up by a chuck when the rollers engage the chuck and the arm is angularly displaced with the chuck until the rollers are disengaged again due to the fact that the chuck and the rollers are moving in diverging paths. During the period that the rollers are in engagement with the chuck the necessary operation is carried out upon a newly inserted tube held within the chuck.

In order that the invention may be clearly understood and readily carried into effect reference is now directed to the accompanying drawings given by way of example and in which:

FIGURE 4 is a section on A—A of FIGURE 3;

FIGURE 5 is a section on B—B of FIGURE 1;

FIGURE 7 is a detail to an enlarged scale of one of the cam arms for use with the mechanism for raising the jaws;

FIGURE 8 is an end elevation in the direction of the arrow A;

FIGURE 9 is a detail to en enlarged scale showing the mechanism for turning the jaws upwardly, these being shown in the inoperative position;

FIGURE 10 is a detail corresponding to FIGURE 9, but showing the jaws in the operative position;

FIGURE 11 is a detail to an enlarged scale showing the jaws in their inoperative position just prior to being raised to grip a tube;

FIGURE 12 is a detail corresponding to FIGURE 11, but showing the jaws raised and gripping a tube;

FIGURE 13 is a linear diagram showing the successive operations in the formation of an ampoule by a conventional rotary ampoule-making machine; and FIGURE 14 is a linear diagram showing the successive operations in the forming of a bottom on a glass tube, using a fitment according to the present invention, prior to the formation of a glass container, for example, an ampoule.

Figure 1:
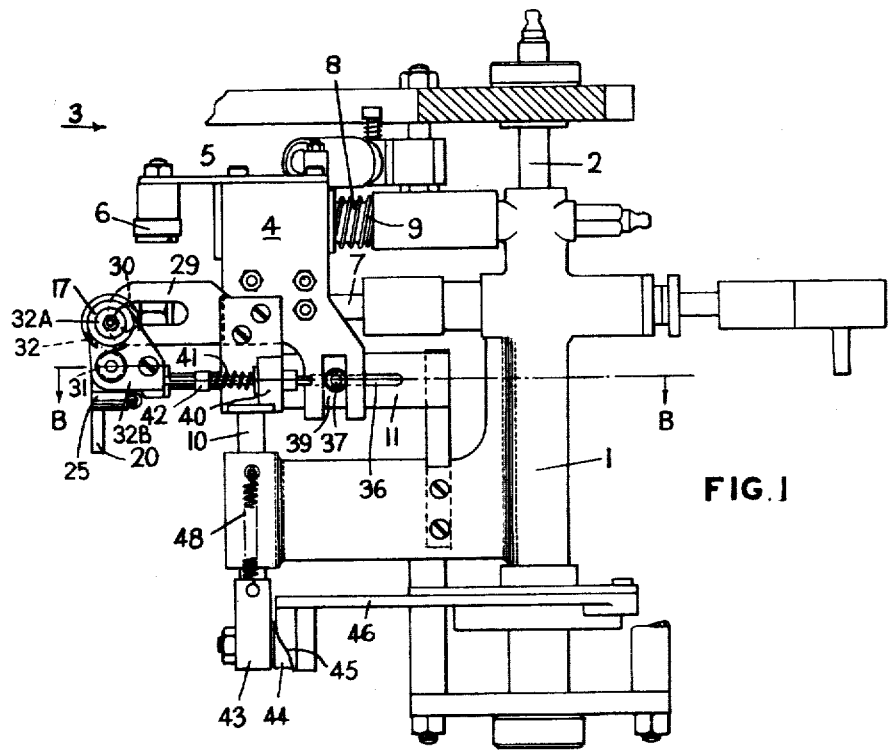
FIGURE 1 is a side elevation of a fitment embodying the invention.
Figure 2:
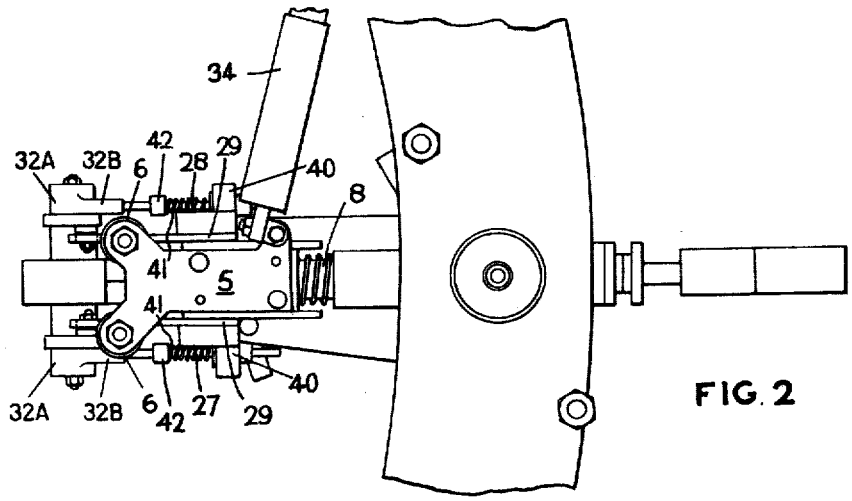
FIGURE 2 is a plan.
Figure 3:
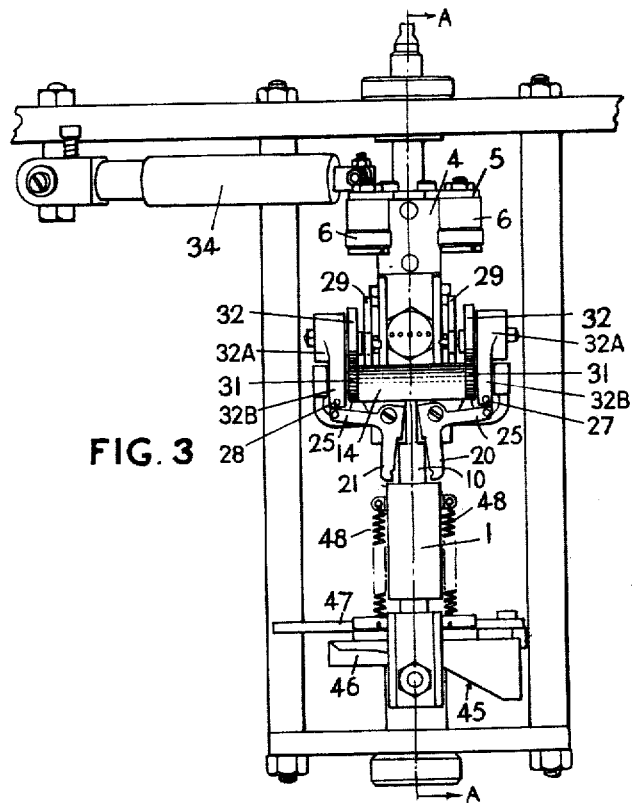
FIGURE 3 is an elevation in the direction of the arrow 3 in FIGURE 1.
Figure 6:
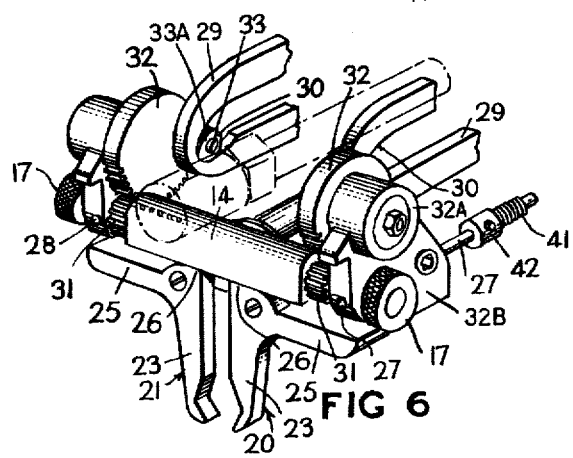
FIGURE 6 is a detail of the mechanism for raising the jaws into operative position.

Referring to FIGURE 13, an upper series of chucks 101 is driven in a circular path and in axial alignment with the chucks in a corresponding series of lower chucks 102, which moves in unison with the upper series of chucks. The chucks 101 and 102 may be conventional, such as shown in Dichter United States Patent No. 1,962,985 and Hughes, Jr., et al. United States Patent No. 2,718,731. The chucks of each pair of upper and lower chucks revolve at the same speed about their common axis and the lower series of chucks is arranged to move in an axial direction toward or away from the upper series of chucks, according to the operation to be performed at each stage. At stage $a$, a glass tube 103, which is open at both ends and from which the ampoules are to be made, is lowered through chuck 101 onto a retractable stop 104 to gauge the length of the tube 103 sufficient to form a single ampoule. The chucks move then to station $b$ at which heat is applied to the tube by a burner 105. At the next stage $c$, the lower chuck 102 moves up to grip the tube, and at stage $d$ the lower chuck moves down to draw the tube so that a stem 106 is formed. At stage $e$ the tube is heated by a parting-off burner 107, and at stage $f$ the length of the tube is separated from its parent tube, the operation being facilitated by a slight downward movement of the lower chuck 102. Simultaneously with the parting-off, a bottom is formed on the parent tube. In a final stage $g$, the jaws of the lower chuck open to permit the discharge of the length of tube. This length has the shape of an ampoule, but is useless since it has no bottom, and is therefore discarded.

It will be understood that the sequence of operations described will be performed by each pair of upper and lower chucks as the pair moves in its circular path, but after the initial forming of a useless ampoule from each parent tube, other ampoules made by the machine would be complete since a bottom has previously been formed on each parent tube during the parting-off stage of the discarded ampoule.

Since the output of ampoules from the conventional machine described is large, the waste of glass caused by the discarded ampoules is considerable and increases manufacturing costs.

The method according to the present invention involves three preliminary stages $x$, $y$, and $z$, FIGURE 14, which may precede the stages of a conventional ampoule-making machine, or other machine producing bottomed glass containers.

At stage $x$, a short length of a parent tube 108 is gauged by a retractable stop 109. At the next stage $y$, the short length is heated by a parting-off burner 110. At the following stage, the end of the short length is gripped by jaws 20, 21 of a fitment to be hereinafter more fully described, and is drawn downwardly to separate a small piece of tube from the parent tube and at the same time forming a bottom on the parent tube 108. The small piece of tube thus removed need only be of sufficient size to be grasped by the jaws 20, 21, so that the location of parting-off is spaced from the lower end of the original parent tube just sufficient to accommodate the jaws 20, 21. The bottomed parent tube is then caused to be lowered onto a retractable stop 110$a$, stage $a$, and a sufficient length of tube is engaged for subsequent operations, as for example, those of a conventional ampoule-making machine. Stage $a$ may correspond to stage $a$ of the conventional machine. Since only a minimum-size piece of glass tube, just sufficient to be gripped by the jaws 20, 21 is wasted during the bottoming operation, the use of a fitment according to the present invention will effect considerable economy in glass.

The mechanism according to the invention may comprise an arm 1 pivotally mounted on trunnions 2, 3 which form a main pivot at a position outside the pitch circle upon which the chucks of a conventional machine for making glass containers revolve. The arm 1 is therefore free to undergo angular displacement in a horizontal plane relatively to the trunnions 2, 3 but it cannot move in any other direction since the trunnions 2, 3 form a fixed pivot.

The arm 1 which is shaped as shown particularly in FIGURE 1 carries a slidable member 4 which is mounted on the arm 1 for sliding movement towards (inwards) and away from (outwards) the chucks. The slidable member 4 has a fitment 5 with two rollers 6 to engage the chucks and is supported upon two tubes 7, 8 extending through holes in the arm 1. The tube 7 has an inner tube which is provided with a gas burner. A spring 9 is provided to return the member 4 to its normal position after it has been moved outwards.

The arm 1 is also provided with a projecting pillar 10 carrying an L-shaped support 11 (FIGURE 1) through which a horizontal rod 12 projects. A member 13 is fixed to the inner end of the rod 12, as shown in FIGURE 4, and this member 13 pivotally supports a jaw holder 14. Normally the jaw holder 14 is turned downwardly at an angle of about 90° so that the jaws can clear the stem of a container during manufacture as it moves into the drawing-off station. The jaw holder 14 is recessed longitudinally at 15 and carries a screw threaded member 16 with a right and left hand screw thread. The member 16 has plain parts 16A to which are fixed small gear wheels 31 each having a boss 16B, which has a bearing in a bracket 32B fixed to the member 13. The ends of the member 16 project beyond the bracket 32B, and fixed to the projecting end are adjusting heads 17. Blocks 18, 19 are mounted on the screw threaded member 16 which blocks fit within the recess 15 as shown more particularly in FIGURES 9 and 10. Pivotally connected to the blocks, as by screws 22, are the jaw members 20, 21, respectively, previously referred to. Each jaw member has a pressure arm 23 to engage the end of the tube 24, FIGURE 5, which is to be drawn off, and a sideways projection 25. It will be apparent that the whole jaw assembly may be angularly displaced on the bosses 16B in a vertical direction. By adjusting the heads 17, the spacing of the jaws one from the other may be regulated. The sideways projections 25 of the jaws are for engagement with tappets 27, 28 which are spring loaded in order that the engagement with the jaws may be resilient. The central part 26 of each jaw member is shaped to form an abutment for engagement with the jaw holder 14 to limit the closing movement of the jaws.

The support 11 carries a cam arm 29 at each side. In each arm 29 there is a curved slot 30, the edges of which form cam surfaces to control the movement of the jaws from the downward position to the horizontal position and vice-versa. The gear wheels 31 each mesh with an associated disc 32 having teeth around a part of its periphery. The disc 32 has a bearing in a boss 32A formed on the bracket 32B carried by the member 13. Each disc 32 has a projection or pin 33 eccentrically disposed and mounting a roller 33A for engaging with the slot 30 in the associated arm 29. In operation the arms 29 do not move horizontally since they are connected to the support 11, therefore when the jaw holder 14 and the other slidable parts are moved outwardly the roller of the pin 33 travels along the slot 30 in each arm 29 and this has the effect of turning each disc 32 on its axis. This angular movement of the discs 32 causes a greater angular movement of the small gear wheels 31 which are mounted at the end of the screw threaded member 16 and this angular movement of the screw threaded member 16 turns the jaws into their horizontal position. The tappet rods 27, 28 project through the brackets 32B and engage the projections 25 when the jaw holder 14 is in the raised position and outward sliding movement of the slidable member 4 carries with it the jaw holder 14 and the various parts described above as being mounted upon the jaw holder. Sliding movement of the jaw holder 14 together with slidable member 4 is due to the fact that the member 13 which supports the jaw holder 14 is rigidly mounted on the horizontal rod 12 which is adapted for movement with the slidable member 4. For this purpose the L-shaped support 11 secured to the pillar 10 is slotted at 36 to receive a transverse pin 37 connected to the horizontal rod 12 and mounting a roller. The transverse pin 37 is extended through the horizontal slot 36 in the support 11 and the rollers at the ends of the pin engage with the side walls of the vertical slots 39 in the slidable member 4. It will therefore be understood that sliding movement of the member 4 will be transmitted to the transverse pin 37 and thus to the horizontal rod 12.

The tappet rods 27, 28 are extended through brackets 40 secured to the support 11 and a spring 41 is provided on each of the tappet rods 27, 28 between the bracket 40 and a collar 42 on each rod. As the jaw holder 14 is moved outwardly during operation of the mechanism the brackets 32B slide on the tappet rods 27, 28, so that the rods are caused to project from the brackets until the latter contact with the collars 42 when further movement of the brackets will compress the springs 41. During the projection of the tappet rods from the brackets, the rods will exert pressure on the projections 25 to close the jaws 20, 21 onto the end of the glass tube to be drawn, the springs serving to provide a resilient grip on the glass tube.

The pillar 10 is provided at its lower end with a fitment 43 carrying a roller 44 for co-operation with a cam surface 45 on a member 46 depending from a stationary arm 47 mounted below the arm 1. The effect of this mechanism is that as the arm 1 undergoes angular displacement, due to the engagement of the rollers 6 with the chucks, the roller 44 engages with the cam surface 45. The shape of the cam surface is such that the roller 44 is forced to move downwardly and this downward movement of the roller 44 is imparted to the support 11 through the pillar 10 carrying the roller 44. As the pillar 10 is drawn vertically downwards through the arm 1, it carries with it not only the support 11, but also the horizontal rod 12, the member 13 and the jaw holder 14 with the jaws. The slidable member 4 is not moved in a vertical direction because the transverse pin 37 simply slides relatively to the slots 39. Repositioning springs 48 are provided to return the parts to their normal position after downward movement.

It will be understood that the arm 1 is pivoted outside the pitch circle of a conventional machine for making glass containers and in such a position that the rollers 6 on the fitment 5 of the machine may engage an oncoming chuck as it is approaching the arm 1. The chuck then carries the arm 1 round until the diverging paths of the arm 1 and the chuck cause the chuck to release the arm 1 and the arm is then drawn back by a spring and dash-pot device 34 in well known manner to its original position to be ready for the approach of the next chuck.

It will also be understood from the above description that the mechanism is intended successively to engage the chucks of the conventional machine and to follow them in part of their circular orbit according to well established principles. During the first part of the angular displacement of the arm 1 the slidable member 4 is urged outwardly of the machine in a radial direction against the action of the main spring 9 and towards the fixed trunnions on which the arm carrying the whole mechanism is mounted.

The sliding movement of the member 4 relatively to the arm 1 is utilised to perform several necessary operations. Firstly the jaws 20, 21 which at the time the rollers 6 engage with a chuck 6A as indicated in FIGURE 11 are turned or inclined downwardly in order to clear containers in process of manufacture, are constrained by the initial travel of the member 4 to swing upwardly into a horizontal position as described. Secondly, further outward movement of the member 4 causes the jaws 20, 21 to close upon the rotating end of the tube held in the chuck as shown in FIGURE 12. When the jaws are gripping the end of the tube the roller 44 coacting with the cam 45 introduces a vertical movement of the jaws which has the result of drawing the end downwards.

The tube has been heated and softened by burners at previous stages and finally by the burner at the station in question in such a manner that the downward drawing action has the effect of separating the end entirely from the parent tube at the same time closing the bottom end of the parent tube. This process is facilitated by the rotation of the parent tube with the chuck and the gripping effect of the jaws, thus a twisting action is imparted to the softened portion of the tube.

As soon as the member has reached its maximum outward movement, that is to say when the chuck has reached its nearest position to the trunnions then the pressure of the chuck on the rollers begins to relax and the main spring begins to return the parts to their original position aided by the other smaller return springs described above.

Although it is unnecessary to do so, for the satisfactory operation of the device greater advantage can be gained if the lower ends of the tubes are trimmed.

In a modification, the jaws, instead of being turned downwardly to clear containers in process of being manufactured, may be opened out widely while remaining in a substantially horizontal plane.

I claim:
1. In a glass-container-making machine having rotary chucks moving about a generally annular path for carrying glass tubes, the improvement comprising an arm pivotally mounted outside the annular path of said chucks, engaging means in the path of movement of said chucks and carried by said arm for pivotal movement therewith and movement generally radially of the pivotal axis of said arm, said engaging means being engageable with and disengageable from each of said chucks successively during their movement along a portion of said annular path to effect pivotal movement of said arm in one direction, heating means carried by said arm for heating a region of the tube carried by the engaged chuck during its movement through said path portion, a support carried by said arm for pivotal movement therewith and vertical movement relative thereto, tube-gripping jaws mounted on said support for movement therewith and for seizing the tube carried by the engaged chuck during movement along said path portion, a cam fixed relative to the pivotal axis of said arm, and cam-follower means carried by said support movable along said cam upon pivotal movement of said arm to effect vertical movement of said support and jaws, said cam being configured to cause only downward jaw movement during pivotal arm movement in said one direction and only upward jaw movement during pivotal arm movement in its opposite direction to close and sever the tube carried by the engaged clutch.

2. The improvement according to claim 1, in combination with resilient means operatively connected to said arm to urge the latter in its opposite direction of pivotal movement to return said arm upon disengagement of said engaging means from a chuck.

3. The improvement according to claim 1, in combination with resilient means connected to said arm and said engaging means and urging the latter radially outward away from said pivotal axis, said engaging means thus being resiliently maintained in engagement with a tube moving through said path portion.

References Cited in the file of this patent

UNITED STATES PATENTS

| | | |
|---|---|---|
| 1,631,674 | Favre | June 7, 1927 |
| 1,812,776 | Donovan et al. | June 30, 1931 |
| 1,885,758 | Parker | Nov. 1, 1932 |
| 2,199,332 | Dichter | Apr. 30, 1940 |
| 2,273,445 | McGowan | Feb. 17, 1942 |
| 2,580,658 | Coby | Jan. 1, 1952 |
| 2,604,732 | Bocast | July 29, 1952 |
| 2,718,731 | Hughes et al. | Sept. 27, 1955 |

FOREIGN PATENTS

| | | |
|---|---|---|
| 46,279 | France | Jan. 22, 1936 |
| 423,419 | Great Britain | Jan. 31, 1935 |
| 741,538 | Great Britain | Dec. 7, 1955 |

UNITED STATES PATENT OFFICE
CERTIFICATE OF CORRECTION

Patent No. 3,105,753                                  October 1, 1963

Ernest Ashford

It is hereby certified that error appears in the above numbered patent requiring correction and that the said Letters Patent should read as corrected below.

In the grant, lines 1 and 2, for "assignor to Johnsen & Jorgensen Limited, a British company," read -- assignor, by mesne assignments, to Johnsen & Jorgensen (Trident) Limited, of London, England, a British company, --; line 11, for "Johnsen & Jorgensen Limited, its successors" read -- Johnsen & Jorgensen (Trident) Limited, its successors --; in the heading to the printed specification, lines 4 and 5, for "assignor to Johnsen & Jorgensen Limited, a British company" read -- assignor, by mesne assignments, to Johnsen & Jorgensen (Trident) Limited, London, England, a British company --.

Signed and sealed this 23rd day of June 1964.

(SEAL)
Attest:

ERNEST W. SWIDER                             EDWARD J. BRENNER
Attesting Officer                                 Commissioner of Patents